United States Patent
Nakai et al.

(10) Patent No.: US 10,830,994 B2
(45) Date of Patent: Nov. 10, 2020

(54) IMAGING LENS AND IMAGING DEVICE

(71) Applicant: TAMRON CO., LTD., Saitama (JP)

(72) Inventors: Seigo Nakai, Saitama (JP); Yasuhiko Obikane, Saitama (JP)

(73) Assignee: TAMRON CO., LTD., Saitama (JP)

( * ) Notice: Subject to any disclaimer, the term of this patent is extended or adjusted under 35 U.S.C. 154(b) by 130 days.

(21) Appl. No.: 16/140,762

(22) Filed: Sep. 25, 2018

(65) Prior Publication Data

US 2019/0235210 A1   Aug. 1, 2019

(30) Foreign Application Priority Data

Jan. 31, 2018   (JP) .................................. 2018-014388

(51) Int. Cl.
- *G02B 9/64* (2006.01)
- *G02B 13/06* (2006.01)
- *G02B 27/00* (2006.01)

(52) U.S. Cl.
CPC ............... *G02B 9/64* (2013.01); *G02B 13/06* (2013.01); *G02B 27/0037* (2013.01)

(58) Field of Classification Search
None
See application file for complete search history.

(56) References Cited

U.S. PATENT DOCUMENTS

| | | | | |
|---|---|---|---|---|
| 5,546,232 A | * | 8/1996 | Hirakawa | ............ G02B 15/177 359/691 |
| 7,903,349 B2 | | 3/2011 | Kitahara | |
| 2018/0059362 A1 | * | 3/2018 | Yeh | ....................... G02B 13/006 |

FOREIGN PATENT DOCUMENTS

| | | |
|---|---|---|
| JP | 2010-107532 A | 5/2010 |
| JP | 2016-188895 A | 11/2016 |

OTHER PUBLICATIONS

Reshidko et al, "Method of calculation and tables of opto-thermal coefficients and thermal diffusivities for glass", SPIE vol. 8844, 884407 (Year: 2013).*

* cited by examiner

*Primary Examiner* — Darryl J Collins
(74) *Attorney, Agent, or Firm* — Paratus Law Group, PLLC

(57) ABSTRACT

An imaging lens according to the present invention includes a negative first lens, a meniscus-shaped negative second lens having a concave surface facing to an object side, a positive third lens, a positive fourth lens having a convex surface on the object side, a positive fifth lens, a negative sixth lens, and a positive seventh lens arranged in order from the object side. Furthermore, an imaging device according to the present invention includes the imaging lens.

10 Claims, 8 Drawing Sheets

IMAGING LENS AND IMAGING DEVICE

CROSS-REFERENCE TO RELATED APPLICATIONS

This application is based on and claims the benefit of priority from Japanese Patent Application No. 2018-014388, filed on Jan. 31, 2018, the entire contents of which are incorporated herein by reference.

BACKGROUND OF THE INVENTION

Technical Field

The present invention relates to an imaging lens and an imaging device, and more particularly, to an imaging lens and an imaging device suitable for a sensing camera.

Related Art

Conventionally, an imaging device using a solid image sensor such as a charge coupled device (CCD) and a complementary metal oxide semiconductor (CMOS) has been widely used. In recent years, pixels of the image sensor have been increased, and a lightweight and compact imaging lens is desired which can obtain a subject image at high resolution even in a dark environment (low illuminance condition).

Furthermore, in addition to a user-portable imaging device such as a single lens reflex camera, a mirrorless camera, and a digital still camera, an imaging device used for a specific purpose such as an on-board imaging device, a monitoring imaging device, and a security imaging device have been widely used. Furthermore, in recent years, various driving assistance has been performed by analyzing an image obtained by the on-board imaging device used as a sensing camera. To realize an automatic drive system in the future, importance of the on-board imaging device as a sensing camera increases.

As an imaging lens which can be applied to the on-board imaging device, various imaging lenses which have a negative lens arranged to be closest to the object side and have a relatively wide angle of view have been proposed. For example, JP 2010-107532 A proposes an imaging lens including a negative lens, a positive lens, a positive lens, a negative lens, and a positive lens arranged in order from the object side. In addition, JP 2016-188895 A proposes an imaging lens including a negative lens, a meniscus-shaped lens, a positive lens, a negative lens, a positive lens, and a lens having an aspherical surface arranged in order from the object side.

SUMMARY OF THE INVENTION

In the imaging lent disclosed in JP 2010-107532 A, an outer diameter of the lens arranged to be closest to the object side is not sufficiently reduced. In the imaging lens disclosed in JP 2016-188895 A, the outer diameter of the lens arranged to be closest to the object side is small, and the imaging lens can be preferably applied to the imaging lens of the on-board imaging device. In addition, since the imaging lens disclosed in JP 2016-188895 A has a wider angle of view than the imaging lens disclosed in JP 2010-107532 A, an on-board imaging device which can image a wide range can be realized. If such an imaging lens having a wide angle of view is applied, detection of an obstacle around the vehicle and recognition of a traffic light, a traffic sign, and the like can be performed in a wide range.

By the way, to realize the automatic drive system, for example, it is required to accurately detect a far object such as a preceding vehicle traveling on a highway. The imaging lens disclosed in JP 2016-188895 A can detect an object existing around the vehicle (obstacle, traffic light, traffic sign, and the like) in a wide range. However, it is difficult to detect a far object. Therefore, in a case where the imaging lens disclosed in JP 2016-188895 A is applied to a sensing camera, it is necessary to detect a far object by using other sensing camera such as a millimeter wave radar and the like.

An object of the present invention is to provide an imaging lens and an imaging device having a wide angle of view which can form an image of a far object at high resolution while reducing an entire size.

To achieve the above object, the imaging lens according to the present invention includes a first lens having negative refractive power, a meniscus-shaped second lens having a concave surface facing to an object side and having negative refractive power, a third lens having positive refractive power, a fourth lens having a convex surface on the object side and having positive refractive power, a fifth lens having positive refractive power, a sixth lens having negative refractive power, and seventh lens having positive refractive power arranged in above order from the object side.

In addition, to achieve the above object, the imaging device according to the present invention includes the imaging lens and an image sensor which receives an optical image formed by the imaging lens and converts the image into an electrical image signal.

According to the present invention, it is possible to provide an imaging lens and an imaging device which can form an image of a far object at high resolution and has a wide angle of view while reducing an entire size of the device.

DESCRIPTION OF THE EMBODIMENTS

Figure 1:
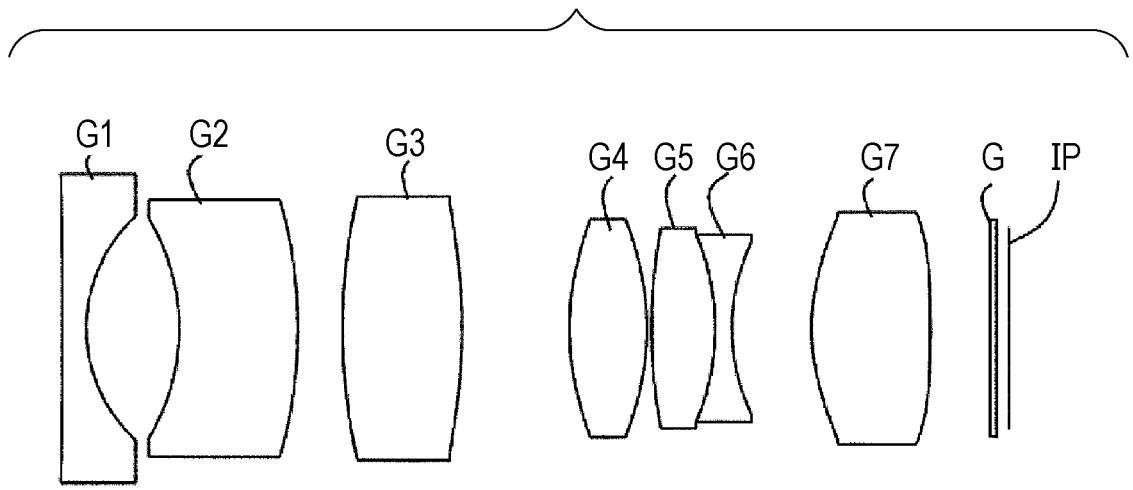
FIG. 1 is a cross-sectional view of an exemplary lens configuration of an imaging lens according to a first embodiment of the present invention.

Embodiments of an imaging lens and an imaging device according to the present invention will be described below.

1. Imaging Lens 1-1. Optical Configuration of Imaging Lens

First, an embodiment of an imaging lens according to the present invention will be described. The imaging lens according to the present embodiment includes a first lens having negative refractive power, a meniscus-shaped second lens having negative refractive power and having a concave surface facing to the object side, a third lens having positive refractive power, a fourth lens having a convex surface on an object side and positive refractive power, a fifth lens having positive refractive power, a sixth lens having negative refractive power, and a seventh lens having positive refractive power. In the imaging lens, the negative refractive power is arranged in the first lens, and the second lens is formed by a meniscus-shaped negative lens having a concave surface facing to the object side. Accordingly, strong negative refractive power can be easily arranged on the object side, and a negative distortion can be easily generated. By arranging the positive refractive power in the third lens and the fourth lens, a pencil of light diverged at the first lens and the second lens can be gently converged by the third lens and the fourth lens. Therefore, it is possible to reduce decentering sensitivity by a bright lens with a large aperture and with an F number. The smaller the value of the F number is, the brighter the lens with a large aperture is. In addition, the positive refractive power is arranged in the fifth lens, and the negative refractive power is arranged in the sixth lens. Accordingly, it is possible to satisfactorily correct various aberrations occurred in each lens. By arranging the positive refractive power in the seventh lens which is arranged to be closest to an image, the pencil of light diverged at the sixth lens can be converged by the seventh lens, and curvature of an image plane can be satisfactorily corrected.

Here, the imaging lens can form an image of a far object at high resolution, and at the same time, an object of the imaging lens is to widen an angle of view. To enable to form an image of the far object at the high resolution, it is necessary to use an imaging lens having a long focal length. This is because the imaging lens having a long focal length has a higher angular resolution than an imaging lens having a short focal length. However, the imaging lens having a long focal length has a narrower angle of view than the imaging lens having a short focal length. Therefore, according to the present invention, in comparison with a normal imaging lens, an overall size can be reduced and a larger negative distortion can be generated by adopting the above configuration. Therefore, according to the present invention, an imaging lens, which maintains a high angular resolution in the vicinity of an optical axis and can obtain a wider angle of view in comparison with the focal length, with a high optical performance can be realized. "The number of pixels in an image sensor for one degree of an angle of view of imaging" is defined as "an angular resolution". In addition, the vicinity of the optical axis means a range of a half angle of view of about 10° from the center (optical axis) in an imaging range of the imaging lens.

As described above, the imaging lens has a high angular resolution in the vicinity of a paraxial line and a wide angle of view. Therefore, when the imaging lens is applied to an imaging optical system of a sensing camera to sense a forward direction of a vehicle, it is possible to accurately detect a far object such as a preceding vehicle traveling on a highway. At the same time, an obstacle existing around the vehicle, a traffic light, a traffic sign, and the like can be detected or recognized in a wide range. Incidentally, the far object means an object positioned on a front side by about 100 m to 200 m, and the wide range means a range of a half angle of view of about 45° to 65°. However, these ranges can be appropriately adjusted according to the position of the object to be imaged.

Each lens will be described below.

(1) First Lens

As long as the first lens has negative refractive power, the shape of the first lens is not particularly limited, and the first lens may be a concave lens, a biconcave lens, a meniscus lens, and the like. To suppress occurrence of various aberrations such as curvature of an image plane, a spherical aberration, and an on-axis comatic aberration and to obtain an imaging lens having a high optical performance while arranging strong negative refractive power in the first lens, it is preferable that a surface on the image side be a concave surface. In addition, it is preferable that a surface of the first lens on the object side be a concave surface to generate large negative distortion. However, in a case where the surface of the first lens on the image side is a concave surface, the surface of the first lens on the object side may be a convex surface. That is, the first lens may be a negative meniscus lens having a convex shape on the object side.

(2) Second Lens

The second lens is a meniscus lens having negative refractive power and having a concave surface facing the object side. By arranging the negative refractive power in the second lens, strong negative refractive power can be arranged on the object side of the imaging lens, and a large negative distortion can be generated, and accordingly, a peripheral angle of view can be effectively widened.

(3) Third Lens

As long as the third lens has positive refractive power, the specific shape of the third lens is not particularly limited. For example, to suppress occurrence of the spherical aberration and to suppress fluctuations in a focus point and an angle of view according to a change in an ambient temperature, it is preferable that the third lens be a biconvex lens.

(4) Fourth Lens

The fourth lens has positive refractive power and has a convex surface on the object side. The fourth lens has the convex surface on the object side so that a spherical aberration, an on-axis comatic aberration, and the like can be satisfactorily corrected, and an imaging lens having a high optical performance can be obtained. A surface on the image side may have any shape such as a plane, a concave surface, and a convex surface. However, to satisfactorily correct the spherical aberration and the on-axis comatic aberration and to suppress the fluctuations in the focus point and the angle of view according to the change in the ambient temperature, it is preferable that the surface of the fourth lens on the image side be a convex surface.

(5) Fifth Lens and Sixth Lens

As long as the fifth lens has positive refractive power, the specific shape of the fifth lens is not particularly limited. As for the sixth lens, as long as the sixth lens has negative refractive power, the specific shape of the sixth lens is not particularly limited. With these two positive and negative lenses, a color aberration around the center can be satisfactorily corrected, and the far object can be imaged at a high resolution.

In addition, it is preferable that the fifth lens and the sixth lens be bonded to each other. By forming the fifth lens and the sixth lens as a cemented lens, the lenses can be easily assembled when the imaging lens is manufactured, and the decentering sensitivity can be lowered. In addition, since the decentering sensitivity can be lowered, deterioration in the optical performance can be prevented which is caused by a difference between the other lens and the optical axis at the time of assembly of the lenses, that is, relative eccentricity.

In a case where the fifth lens and the sixth lens are formed as a cemented lens, it is preferable that a composite focal length of the fifth lens and the sixth lens be negative to satisfactorily correct various aberrations.

(6) Seventh Lens

As long as the seventh lens has positive refractive power, the specific shape of the seventh lens is not particularly limited. By arranging the seventh lens having positive refractive power in the imaging lens and on the side closest to the image, one-side blur can be satisfactorily corrected. Note that the one-side blur means that a resolution in a specific direction is lower than that of the other direction in the periphery of the image.

(7) Lens Glass Material

It is preferable that each of the first lens to the seventh lens forming the imaging lens according to the present invention be a glass lens. The glass lens has higher thermal stability and smaller expansion and contraction due to temperature fluctuation than plastic. Therefore, by using glass lenses for all the lenses, even when the ambient temperature is changed, the fluctuations in the focus point and the angle of view can be satisfactorily suppressed.

(8) Stop

An arrangement position of a stop (aperture stop) of the imaging lens according to the present invention is not particularly limited. However, as the position of the stop gets closer to the image plane of the imaging lens, an incident angle of imaging light relative to the image plane increases. When the incident angle of the imaging light increases, manufacturing variations easily occur, and the fluctuations in the focus point and the angle of view easily occur. Therefore, it is difficult to realize a desired angle of view, and it is difficult to image a required imaging range. From this point of view, it is preferable that the stop be arranged closer to the object than the fourth lens.

1-2. Support Mechanism of Each Lens (1) Direction Perpendicular to Optical Axis

The first lens to the seventh lens included in the imaging lens are fixed to a lens barrel via a lens frame (lens supporting portion). A holding portion for holding each lens is provided in the lens frame. The holding portion is positioned so that the lenses are substantially coaxially (including a case of coaxial lenses) arranged and intervals between the lenses are set to predetermined intervals, and the holding portion is fixed to the lens frame. In each holding portion, a groove to which the lens is inserted is provided, and each lens is substantially coaxially positioned by inserting the outer peripheral portion (edge portion) of the lens into the groove. The depth of the insertion when each lens is inserted into the groove can be finely adjusted. For example, when each lens is held by the holding portion in order from the object side, each lens can be fixed to the holding portion with adhesive and the like after the depth of the insertion of each lens has been adjusted for axis alignment.

Here, the lens frame may be formed as a single component (unit) integrally including all the lens holding portions. However, for example, it is also preferable that the lens frame include a plurality of lens frame units. By forming the lens frame from the plurality of lens frame units, axis alignment and the interval between the lenses on the optical axis can be accurately adjusted.

For example, the lens frame may include a first lens frame and a second lens frame which is coupled to the first lens frame so that the position can be changed along a direction perpendicular to the optical axis. In this case, the second lens frame has a holding portion for holding at least one of the fourth lens to the seventh lens, and the first lens frame has a holding portion for holding the other lenses. It is preferable that the lens having higher decentering sensitivity than the other lens be held by and fixed to the second lens frame.

With this configuration, after the lens is aligned and fixed to each lens frame, alignment can be performed again by adjusting the position of the second lens frame along the direction perpendicular to the optical axis relative to the first lens frame. As a result, the on-axis comatic aberration, the spherical aberration, and the one-side blur caused by eccentricity at the time of assembly of the lenses can be adjusted, and deterioration in the optical performance according to the assembly operation of the lenses can be prevented. After the position of the second lens frame relative to the first lens frame has been adjusted, it is preferable that the second lens frame be fixed to the first lens frame with the adhesive and the like so as not to cause a fluctuation in the position of the second lens frame relative to the first lens frame.

In the imaging lens, for example, the fifth lens and the sixth lens have higher decentering sensitivity than the other lenses. Therefore, by holding the fifth lens and the sixth lens by the second lens frame, the alignment can be accurately and easily performed by changing and positioning the position of the second lens frame in the direction perpendicular to the optical axis relative to the first lens frame.

Furthermore, as another preferable aspect of the imaging lens, a configuration may be used which includes the first lens frame and the second lens frame coupled to the first lens frame in a state where the position of the second lens frame can be changed along the direction perpendicular to the optical axis relative to the first lens frame, and the above configuration may be used as a vibration-compensation group to correct image blur by moving the second lens frame along the direction perpendicular to the optical axis by an actuator and the like when vibration is applied to the imaging lens.

(2) Optical Axis Direction

For example, in the imaging lens, the lens frame may include the first lens frame and a third lens frame which is coupled to the first lens frame so that the position can be changed along the optical axis direction. In this case, it is possible that the third lens frame has a holding portion for holding at least one of the fourth lens to the seventh lens, and the first lens frame has a holding portion for holding the other lenses.

In a case where the imaging lens includes the second lens frame, the second lens frame and the third lens frame may be formed as the same lens frames and may be formed as different lens frames. In a case where the second lens frame and the third lens frame are formed as the same lens frames, the lens frames are coupled to the first lens frame so that the positions can be changed along the direction perpendicular to the optical axis and so that the position can be changed along the optical axis direction.

In a case where the second lens frame and the third lens frame are formed as different lens frames, the lenses other than the lens held by and fixed to the second lens frame from among the fourth lens to the seventh lens can be held by and fixed to the third lens frame.

In either case, by coupling the third lens frame to the first lens frame so that the position can be changed along the optical axis direction, the interval between the lens held by and fixed to the first lens frame and the lens held by and fixed to the third lens frame can be adjusted after the lens has been aligned to each lens frame.

After the position of the third lens frame relative to the first lens frame has been adjusted, it is preferable that the third lens frame be fixed to the first lens frame with the adhesive and the like so as not to cause a fluctuation in the position of the third lens frame relative to the first lens frame.

1-3. Conditional Expression

In the imaging lens, it is preferable that at least one or more conditional expressions to be described below be satisfied.

1-3-1. Conditional Expression (1)

$$0 < f1/f2 < 1.0 \quad (1)$$

where,
f1: focal length of the first lens
f2: focal length of the second lens

The conditional expression (1) defines a ratio of the focal length of the first lens relative to the focal length of the second lens. In the imaging lens, both of the first lens and the second lens have negative refractive power. In a case where the conditional expression (1) is satisfied, strong negative refractive power is arranged in the first lens, and a large negative distortion can be generated. Therefore, a wide angle of view can be obtained while maintaining a high angular resolution in the vicinity of the paraxial line. Therefore, when the imaging lens is applied to an imaging optical system of a sensing camera to sense a forward direction of a vehicle, it is possible to accurately detect a far object such as a preceding vehicle traveling on a highway, and an obstacle existing around the vehicle, a traffic light, a traffic sign, and the like can be detected in a wide range.

On the other hand, when a value of the conditional expression (1) is equal to or more than the upper limit value, the refractive power of the first lens decreases to be equal to or less than the refractive power of the second lens. In this case, the amount of distortion that occurs is reduced. Therefore, this is not preferable because it is difficult to obtain an imaging lens having a wide angle of view as compared with a focal length. Since the first lens and the second lens have negative refractive power, the value of the conditional expression (1) does not become equal to or less than zero. When the value of the conditional expression (1) is equal to or less than zero, either one of the first lens or the second lens has positive refractive power. In this case, a positive distortion is generated, and an angle of view is narrowed. Therefore, it is necessary to increase an outer diameter of the lens on the object side to realize the wider angle of view, and it is difficult to reduce the size of the imaging lens.

To obtain the effect described above, the upper limit value of the conditional expression (1) is preferably 0.8, more preferably, 0.6, more preferably 0.5, and still more preferably, 0.4. It is preferable that the lower limit value of the conditional expression (1) be 0.1.

1-3-2. Conditional Expression (2)

It is preferable that the imaging lens satisfy the following conditional expression (2).

$$0 < -f12/f4567 < 1.0 \quad (2)$$

where,
f12: composite focal length of the first lens and the second lens
f4567: composite focal length of the fourth lens, the fifth lens, the sixth lens, and the seventh lens The conditional expression (2) defines a ratio of the composite focal length of the first lens and the second lens relative to the composite focal length of the fourth lens to the seventh lens. In a case where the conditional expression (2) is satisfied, refractive power suitable for generating a negative distortion larger than that of a normal imaging lens can be arranged while a focal length with which the far object can be imaged at a high resolution is maintained. In addition, various aberrations can be easily suppressed, and an imaging lens with high imaging performance can be easily obtained.

On the other hand, when a value of the conditional expression (2) is equal to or more than the upper limit value, since negative refractive power arranged in the imaging lens on the object side is reduced, an amount of distortion lacks, and it is difficult to widen the angle of view of the imaging lens.

To obtain the effect described above, the upper limit value of the conditional expression (2) is preferably 0.9, and more preferably 0.8. The lower limit value of the conditional expression (2) is preferably 0.2, and more preferably 0.4.

1-3-3. Conditional Expression (3)

In the imaging lens, it is preferable that at least one of the fourth lens, the fifth lens, and the seventh lens be formed of a glass material which satisfies the following condition.

$$-15 < dndt\_p/dndt6 < 0 \quad (3)$$

where,
dndt_p: temperature coefficient of a relative refractive index of the glass material relative to a d line
dndt6: temperature coefficient of a relative refractive index of a glass material of sixth lens relative to the d line In the imaging lens, a pencil of light is diverged by the first lens and the second lens. Therefore, when the refractive indices of the fourth lens, the fifth lens, and the seventh lens which have positive refractive power and are arranged on the image side in the imaging lens change according to the change in the ambient temperature, the fluctuations in the focus point and the angle of view easily occur. Therefore, at least one of the fourth lens, the fifth lens, and the seventh lens which have positive refractive power and are arranged on the image side in the imaging lens satisfies the conditional expression (3) so that the fluctuations in the focus point and the angle of view can be suppressed even when the ambient temperature is changed, and it is possible to realize an imaging lens having excellent temperature characteristics.

Here, to realize the imaging lens having excellent temperature characteristics, it is preferable that two or more of the fourth lens, the fifth lens, and the seventh lens be formed of the glass material which satisfies the conditional expression (3), and it is more preferable that all of the fourth lens, the fifth lens, and the seventh lens be formed of the glass material which satisfies the conditional expression (3). Note that the excellent temperature characteristics means that the fluctuations in the focus point and the angle of view when the ambient temperature is changed are small.

To obtain the effect described above, the upper limit value of the conditional expression (3) is preferably -1, more preferably, -1.5, more preferably, -2.0, and still more preferably, -2.5. The lower limit value of the conditional expression (3) is preferably -10, more preferably, -8, and still more preferably, -6, and yet more preferably, -4, and further preferably, -3.

1-3-4. Conditional Expression (4)

It is preferable that the imaging lens satisfy the following conditional expression.

$$f0/(4 \times YS1) \leq 1.0 \quad (4)$$

where, f0: focal length of the imaging lens

YS1: maximum ray height of upper line of axial ray on an object side surface of the first lens When the above conditional expression is satisfied, the bright imaging lens has a large diameter and has the F number equal to or less than 2.0. Therefore, a clear subject image can be obtained under a dark environment such as nighttime. Therefore, in a case where the imaging lens is applied to an imaging optical system of a sensing camera, it is possible to realize excellent long-distance sensing and short-distance sensing at any time of a day.

As the upper limit value of the conditional expression is smaller, the bright imaging lens having a small F number can be realized. Therefore, the upper limit value of the conditional expression is preferably 0.95, more preferably, 0.90, and still more preferably, 0.85. Since a focal length of the entire imaging lens system is longer than zero, it is obvious that the lower limit value is larger than zero.

1-3-5. Conditional Expression (5)

It is preferable that the imaging lens satisfy the following conditional expression.

$$0.1<\{(Yim/\tan(\theta im))/f0\}^2<0.4 \quad (5)$$

where,

Yim: image height of an effective image circle

θim: incident half angle of view of the effective image circle f0: focal length of the imaging lens Here, the effective image circle means an effective diameter of an image circle expressing a range where an image can be formed on the image plane (maximum range where imaging is available). By satisfying the conditional expression (5), an incident angle of an off-axis ray relative to the image plane decreases from the center toward the periphery. Therefore, it is possible to obtain a wider angle of view in comparison with the focal length of the imaging lens while high angular resolution is maintained in the vicinity of the optical axis.

On the other hand, when the value of the conditional expression (5) is equal to or more than the upper limit value, the amount of the distortion lacks, and it is difficult to widen the angle of view. In addition, when the value of the conditional expression (5) is equal to or less than the lower limit value, the amount of the distortion becomes too large, and the periphery of the image is compressed. That is, the resolution in the periphery of the image decreases. Therefore, this is not preferable because it is difficult to recognize the subject reflected in the periphery of the image at the time of sensing and the like.

To obtain the effect described above, the upper limit value of the conditional expression (5) is preferably 0.35, and more preferably, 0.30. It is preferable that the lower limit value of the conditional expression (5) be 0.15.

2. Imaging Device

Next, the imaging device according to the present invention will be described. The imaging device according to the present invention includes the imaging lens according to the present invention and an image sensor which receives an optical image formed by the imaging lens and converts the image into an electrical image signal.

Here, the image sensor is not particularly limited, and a solid image sensor such as a charge coupled device (CCD) sensor, a complementary metal oxide semiconductor (CMOS) sensor can be used. The imaging device according to the present invention is suitable for an imaging device using these solid image sensors, such as a digital camera and a video camera. Furthermore, it is natural that the imaging device may be a lens-fixed-type imaging device in which a lens fixed to a housing and a lens-exchange-type imaging device such as a single lens reflex camera and a mirrorless camera.

The imaging device according to the present invention can be used for an installed and fixed type imaging device such as an on-board imaging device which is installed and fixed to a vehicle body or a building and is used for a specific purpose such as monitoring or sensing, in addition to a general imaging device used to image a subject to view the image. By generating a negative distortion larger than that of a normal imaging lens, the imaging lens according to the present invention can image a far object at high resolution while reducing the entire size, and a wider angle of view than the focal length is realized. Therefore, the imaging device can be inconspicuously provided in the vehicle body and the like. Then, an object positioned apart can be imaged by a single imagine device, and surrounding in a wide range can be also imaged. Therefore, even when the vehicle is traveling on a wide road including three or five lanes at a high speed, if the imaging device performs forward sensing, a preceding vehicle in front of the vehicle can be accurately detected, and the right side and the left side can be concurrently confirmed when changing the lane and the like. In this way, the imaging device is mounted on various moving bodies such as an on-board imaging device (land moving body, aerial moving body, marine moving body), and is suitable for a sensing camera used to detect or recognize an object forward in the traveling direction and an object around each moving body. It is assumed that the moving body include various moving bodies including vehicles such as an automobile, an airplane, and a ship, an unmanned aerial vehicles (drone and the like) or an unmanned search vehicle, and in addition, a robot having a self-moving function such as an autonomous bipedal walking robot (cleaning robot and the like).

Next, the present invention will be specifically described with reference to embodiments. However, the present invention is not limited to the following embodiments. The imaging lens according to the embodiment below is an imaging lens used for an imaging device (optical device) such as a digital camera, a video camera, and a silver halide film camera. Particularly, the imaging lens can be preferably applied to an on-board imaging device and can be preferably applied to a sensing camera mounted on various moving bodies. Furthermore, in a cross-sectional view of each lens, the left side of the drawing is the object side, and the right side is the image side.

First Embodiment (1) Configuration of Imaging Lens

FIG. 1 is a lens cross-sectional view of a configuration of an imaging lens according to a first embodiment of the present invention. The imaging lens includes a first lens G1 which has negative refractive power and has a biconcave shape, a meniscus-shaped second lens G2 which has a concave surface facing to the object side and has negative refractive power, a third lens G3 which has positive refractive power and has a biconvex shape, a fourth lens G4 which has positive refractive power and has a biconvex shape, a cemented lens formed by bonding a fifth lens G5 which has positive refractive power and has a biconvex shape and a sixth lens G6 which has negative refractive power and has a biconcave shape, and a seventh lens G7 which has positive refractive power and has a biconvex shape in order from the object side. As indicated in Table 1 to be described later, both surfaces of the third lens G3, both surfaces of the fourth lens G4, and both surfaces of the seventh lens G7 are aspherical surfaces. The imaging lens is a fixed-focus lens of which a focal length is fixed.

The reference "IP" in FIG. 1 indicates an image plane. The image plane is an imaging surface of a solid image sensor such as a CCD sensor and a CMOS sensor described above. Light which enters the imaging lens from the object side forms an image on the image plane. The solid image sensor converts a received optical image into an electrical image signal. An image processing unit (image processing processor and the like) included in the imaging device and the like generates a digital image corresponding to an image of a subject based on the electrical image signal output from the image sensor.

The digital image can be recorded to various recording media such as a hard disk drive (HDD), a memory card, an optical disk, and a magnetic tape. In a case where the imaging device is mounted on a vehicle and used for sensing, the imaging device recognizes a preceding vehicle, a distance with the preceding vehicle, an obstacle around the vehicle, a traffic light, and a traffic sign in real time based on the digital image which has been temporarily recorded in a RAM and the like without recording the digital image in the recording media described above.

The reference "G" illustrated on the object side of an image plane IP is an optical block. The optical block G corresponds to an optical filter, a face plate, a quartz low-pass filter, an infrared cut filter, or the like. Since these references (IP, G) respectively indicate the same components in each figure described in the other embodiments. Therefore, description thereof will be omitted below.

(2) Numerical Example

A numerical example to which specific values of the imaging lens adopted in the first embodiment are applied will be described. Table 1 indicates lens data of the imaging lens. In Table 1, the "surface number" indicates a number of a lens surface counted from the object side, the reference "r" indicates a radius of curvature of the lens surface (however, surface of which r is INF indicates a plane surface), the reference "d" indicates an interval between an i-th lens surface (i is natural number) from the object side and an i+1-th lens surface on an optical axis of the lens surface, the reference "nd" indicates a refractive index relative to the d line (wavelength $\lambda$=587.56 nm), and the reference "vd" indicates an Abbe number relative to the d line. However, in a case where the lens surface is an aspherical surface, "*" is added next to the surface number in Table 1. In addition, when the lens surface is an aspherical surface, a paraxial radius of curvature is described in a field of "r". The references "G" and "IP" described in the field of the surface number respectively indicate an optical block and an image plane.

Table 2 indicates various data of the imaging lens. Specifically, a focal length (mm) of the imaging lens, an F number, a half angle of view (°), an image height (mm), a lens total length (mm), and a back focus (BF) (mm) are indicated. Here, the lens total length is a value obtained by adding a back focus to a distance from the surface of the first lens on the object side to a surface on the image side of an n-th lens arranged to be closest to the image, here, the seventh lens G7 on the optical axis. The back focus is a value obtained by aerially converting a distance from the surface of the n-th lens on the image side to a paraxial image plane. In Table 2, values at the time when the ambient temperature is 20° C., 105° C., and −30° C. are described.

Table 3 indicates aspherical surface data. As the aspherical surface data, an aspherical surface coefficient in a case where the shape of the aspherical surface indicated in Table 1 is defined by the following expression is described. The aspherical surface coefficient can be expressed by the following aspherical surface expression using a displacement in the optical axis direction at a height h from the optical axis as a surface apex reference. In Table 3, the reference "E-a" means "$\times 10^{-a}$".

$$z=ch^2/1+\{1-(1+k)c^2h^2\}^{1/2}]+A4h^4+A6h^6+A8h^8+A10h^{10}+A12h^{12} \quad \text{[Expression 1]}$$

However, c is the curvature (1/r), h is the height from the optical axis, k is a conic coefficient (conic constant), and A4, A6, A8, A10, and A12 are aspherical surface coefficients of respective orders. In addition, a notation "E±m" (m represents integer) as values of the aspherical surface coefficient and the conic constant means "$\times 10^{\pm m}$".

Table 4 indicates a temperature coefficient of a relative refractive index relative to the d line of each glass material forming the fourth lens to the seventh lens (unit: $1\times10^{-6}$/K). "10^-6" described in Table 4 means "$10^{-6}$".

Numerical values of the conditional expressions (1) to (5) of the imaging lens will be described below. These values are indicated together with values in other examples in Table 17.

Conditional expression (1): 0.31 (f1=−7.98, f2=−26.01)

Conditional expression (2): 0.43 (f12=−5.95, f4567=13.89)

Conditional expression (3): −2.68 (fourth lens), −2.64 (fifth lens), −2.68 (seventh lens)

Conditional expression (4): 0.80 (f0=4.93, YS1=1.55)

Conditional expression (5): 0.24 (Yim=4.22, θim=60.00, f0=4.93)

Matters regarding Tables are similar to those in Tables indicated in the other embodiments. Therefore, description thereof will be omitted below.

Figure 2:
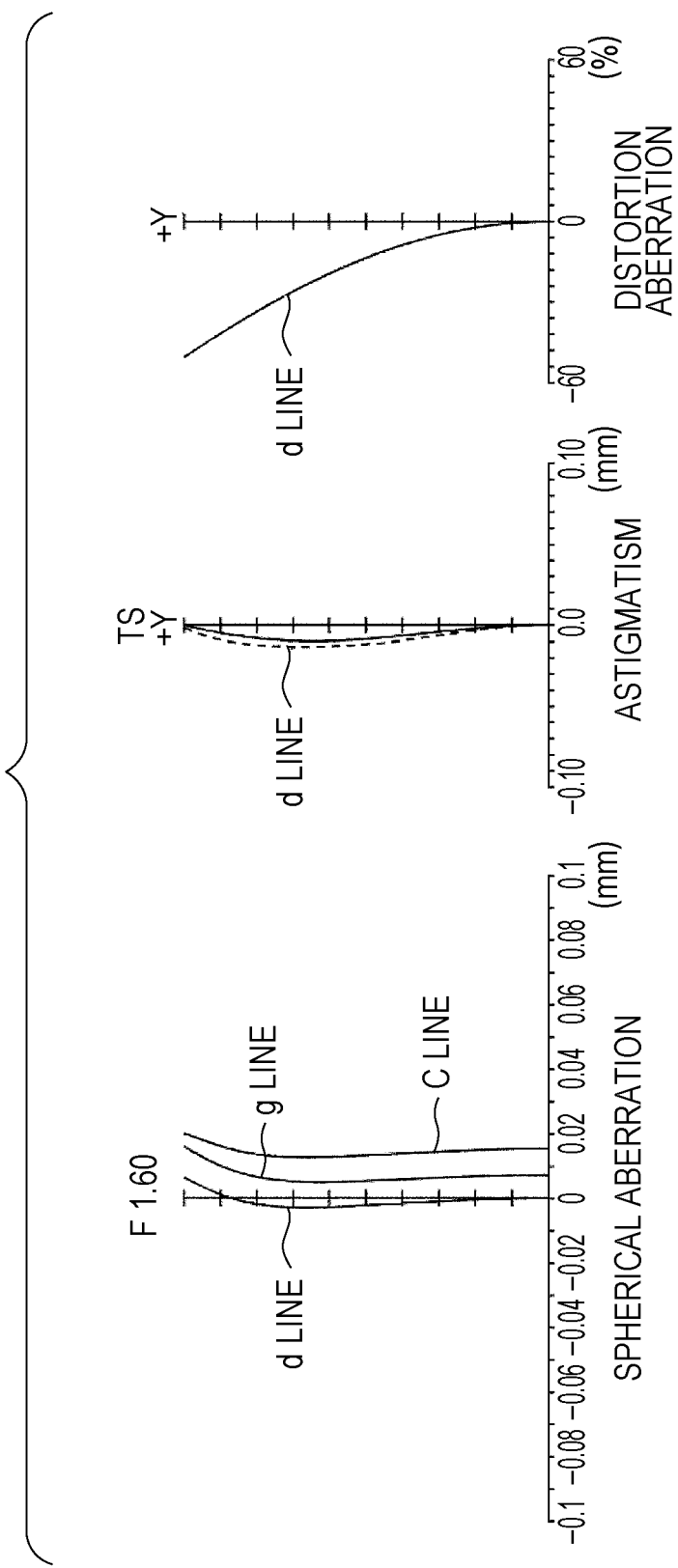
FIG. 2 is a spherical aberration diagram, an astigmatism diagram, and a distortion aberration diagram at the time of infinity focusing of the imaging lens according to the first embodiment.

In FIG. 2, a vertical aberration diagram at the time of infinity focusing of the imaging lens is illustrated. The vertical aberration diagrams illustrated in FIG. 2 respectively indicates a spherical aberration (mm), an astigmatism (mm), and a distortion aberration (%) in order from the left side in FIG. 2. In the diagram indicating the spherical aberration, the vertical axis indicates an open F number (Fno), and indicates a spherical aberration of the d line (wavelength 587.56 nm), a spherical aberration of a C line (wavelength 656.27 nm), and a spherical aberration of a g line (wavelength 435.84 nm).

In the diagram representing the astigmatism, the vertical axis indicates an image height (Y). A solid line indicates a sagittal direction (S) of the d line (wavelength 587.56 nm), and a broken line indicates a meridional direction (T) of the d line.

In the diagram representing the distortion aberration, the vertical axis indicates the image height (Y), and the distortion aberration (distortion) of the d line (wavelength 587.56 nm) is indicated. As illustrated in FIG. 2, the imaging lens has a large negative distortion aberration. The matters regarding the vertical aberration diagram are similar to those is the vertical aberration diagram indicated in the other embodiments. Therefore, description thereof will be omitted below.

TABLE 1

| SURFACE NUMBER | r | d | nd | vd |
|---|---|---|---|---|
| 1 | −300.14 | 1.00 | 1.773 | 49.6 |
| 2 | 6.31 | 3.91 | | |
| 3 | −8.89 | 5.00 | 1.806 | 33.3 |
| 4 | −19.31 | 1.88 | | |
| 5※ | 24.79 | 5.00 | 1.851 | 40.1 |
| 6※ | −24.58 | 4.52 | | |
| 7※ | 10.91 | 3.25 | 1.497 | 81.6 |
| 8※ | −11.66 | 0.20 | | |
| 9 | 22.95 | 2.69 | 1.593 | 68.6 |
| 10 | −9.98 | 0.70 | 1.728 | 28.3 |
| 11 | 8.45 | 3.36 | | |
| 12※ | 9.01 | 5.00 | 1.497 | 81.6 |
| 13※ | −55.95 | 2.49 | | |
| G | INF | 0.30 | 1.517 | 64.2 |
| G | INF | 0.50 | | |
| IP | INF | | | |

TABLE 2

VARIOUS DATA

| | |
|---|---|
| FOCAL LENGTH (mm) | 4.93 |
| F NUMBER | 1.59 |
| HALF ANGLE OF VIEW (°) | 60.00 |
| IMAGE HEIGHT (mm) | 4.22 |
| LENS TOTAL LENGTH (mm) | 40.79 |
| BACK FOCUS AT THE TIME OF 20° C. (mm) | 3.29 |
| BACK FOCUS AT THE TIME OF 105° C. (mm) | 3.29 |
| BACK FOCUS AT THE TIME OF −30° C. (mm) | 3.28 |

TABLE 3

| SURFACE NUMBER | (1 + k) | A4 | A6 | A8 | A10 | A12 |
|---|---|---|---|---|---|---|
| 5 | 1.000 | −4.731E−05 | 5.182E−07 | 1.476E−08 | 3.046E−11 | 0.000E+00 |
| 6 | 1.000 | 1.980E−05 | 1.778E−06 | 1.047E−09 | 4.342E−10 | 0.000E+00 |
| 7 | 1.000 | −2.665E−04 | 3.086E−07 | −5.887E−09 | −1.470E−10 | 0.000E+00 |
| 8 | 1.000 | 7.763E−05 | 6.302E−07 | −1.375E−08 | −4.614E−12 | 0.000E+00 |
| 12 | 1.000 | −3.050E−04 | −4.480E−06 | 7.105E−08 | −7.762E−09 | 0.000E+00 |
| 13 | 1.000 | −5.956E−04 | −3.872E−06 | −2.607E−08 | −1.873E−09 | 0.000E+00 |

TABLE 4

TEMPERATURE COEFFICIENT OF RELATIVE REFRACTIVE INDEX OF GLASS MATERIAL TO d LINE

| | |
|---|---|
| FOURTH LENS | −5.9 × 10^−6/K |
| FIFTH LENS | −5.8 × 10^−6/K |
| SIXTH LENS | 2.2 × 10^−6/K |
| SEVENTH LENS | −5.9 × 10^−6/K |

Second Embodiment (1) Configuration of Imaging Lens

Figure 3:
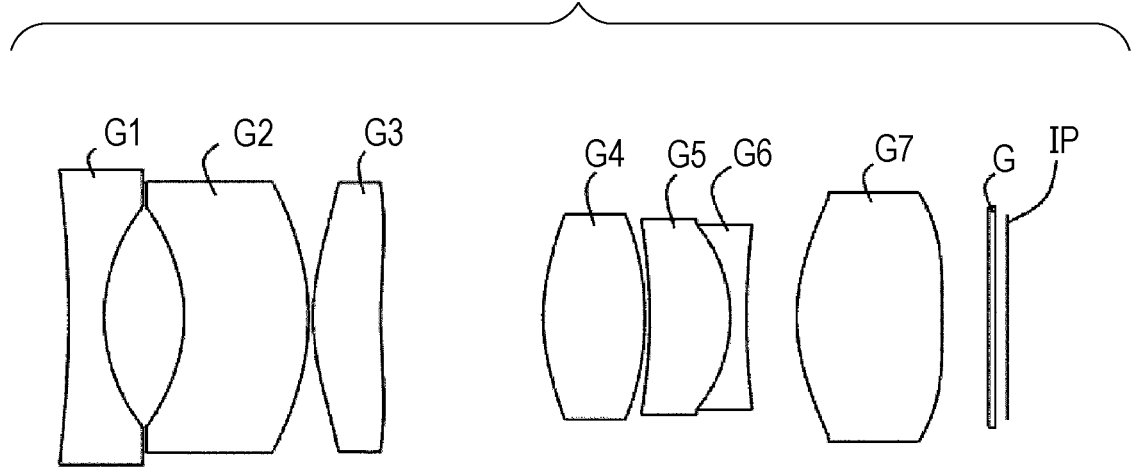
FIG. 3 is a cross-sectional view of an exemplary lens configuration of an imaging lens according to a second embodiment of the present invention.

FIG. 3 is a lens cross-sectional view of a configuration of an imaging lens according to a second embodiment of the present invention. The imaging lens includes a first lens G1 which has negative refractive power and has a biconcave shape, a meniscus-shaped second lens G2 which has a concave surface facing to the object side and has negative refractive power, a third lens G3 which has positive refractive power and has a convex shape on the object side, a fourth lens G4 which has positive refractive power and has a biconvex shape, a cemented lens formed by bonding a fifth lens G5 which has positive refractive power and has a convex shape on the image side and a sixth lens G6 which has negative refractive power and has a biconcave shape, and a seventh lens G7 which has positive refractive power and has a biconvex shape in order from the object side. As indicated in Table 5 below, both surfaces of the second lens G2, both surfaces of the third lens G3, both surfaces of the fourth lens G4, and both surfaces of the seventh lens G7 are aspherical surfaces. The imaging lens is a fixed-focus lens of which a focal length is fixed.

(2) Numerical Example

A numerical example to which specific values of the imaging lens adopted in the second embodiment are applied will be described. Tables 5 to 8 respectively indicate lens data of the imaging lens, various data of the imaging lens, aspherical surface data, and a temperature coefficient of a relative refractive index relative to a d line of each glass material forming the fourth lens to the seventh lens (unit: $1 \times 10^{-6}$/K).

Numerical values of the conditional expressions (1) to (5) of the imaging lens will be described below. These values are indicated together with values in other examples in Table 17.

Conditional expression (1): 0.13 (f1=−7.98, f2=−61.51)
Conditional expression (2): 0.66 (f12=−8.44, f4567=12.76)
Conditional expression (3): −2.68 (fourth lens), −0.91 (fifth lens), −2.68 (seventh lens)
Conditional expression (4): 0.80 (f0=5.72, YS1=1.79)
Conditional expression (5): 0.17 (Yim=4.28, θim=61.30, f0=5.72)

Figure 4:
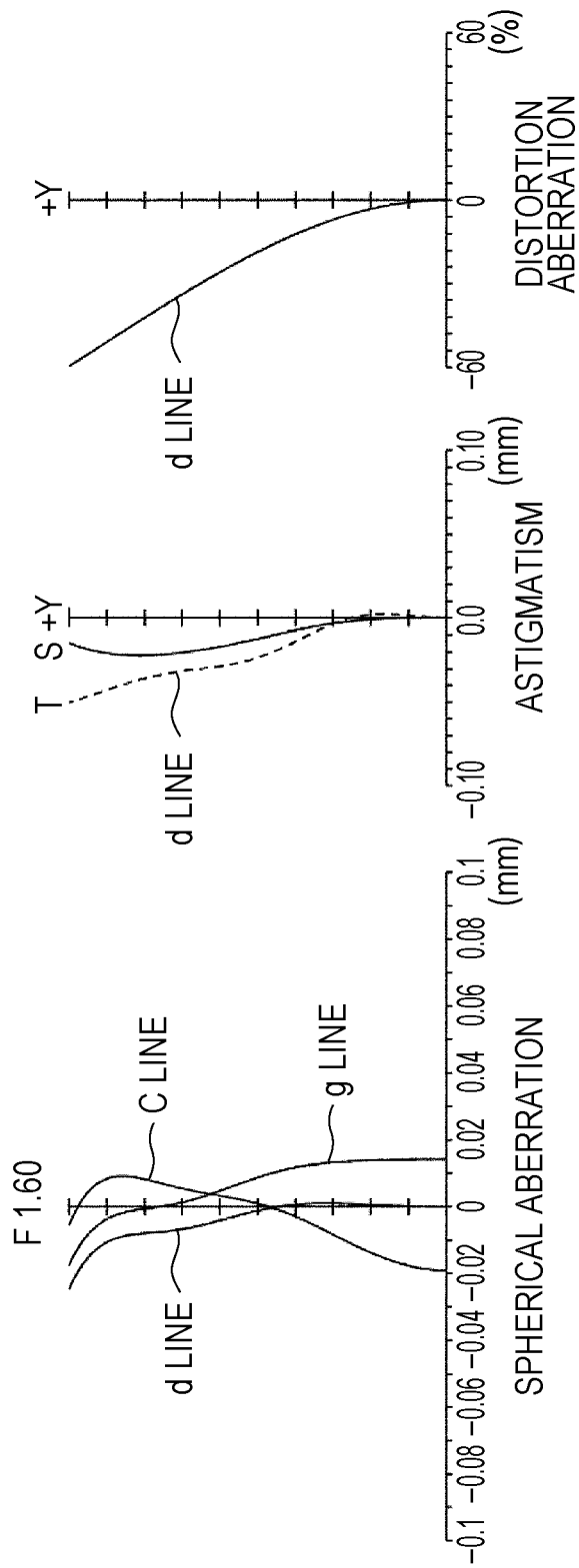
FIG. 4 is a spherical aberration diagram, an astigmatism diagram, and a distortion aberration diagram at the time of infinity focusing of the imaging lens according to the second embodiment.

FIG. 4 is a vertical aberration diagram at the time of infinity focusing of the imaging lens. As illustrated in FIG. 4, the imaging lens has a large negative distortion aberration.

TABLE 5

| SURFACE NUMBER | r | d | nd | vd |
|---|---|---|---|---|
| 1 | −51.63 | 1.51 | 1.806 | 33.3 |
| 2 | 7.45 | 3.39 | | |
| 3※ | −6.41 | 5.26 | 1.851 | 40.1 |
| 4※ | −10.06 | 0.20 | | |
| 5※ | 10.02 | 2.85 | 1.851 | 40.1 |
| 6※ | 22.80 | 6.87 | | |
| 7※ | 8.64 | 4.30 | 1.497 | 81.6 |
| 8※ | −12.77 | 0.20 | | |
| 9 | −24.00 | 3.42 | 1.618 | 63.4 |
| 10 | −6.07 | 0.70 | 1.728 | 28.3 |
| 11 | 3262 | 2.12 | | |
| 12※ | 7.91 | 6.18 | 1.497 | 81.6 |
| 13※ | −129.57 | 1.94 | | |
| G | INF | 0.30 | 1.517 | 64.2 |
| G | INF | 0.50 | | |
| IP | INF | | | |

TABLE 6

| VARIOUS DATA | |
|---|---|
| FOCAL LENGTH (mm) | 5.72 |
| F NUMBER | 1.60 |
| HALF ANGLE OF VIEW (°) | 61.30 |
| IMAGE HEIGHT (mm) | 4.28 |
| LENS TOTAL LENGTH (mm) | 40.50 |
| BACK FOCUS AT THE TIME OF 20° C. (mm) | 3.24 |
| BACK FOCUS AT THE TIME OF 105° C. (mm) | 3.24 |
| BACK FOCUS AT THE TIME OF −30° C. (mm) | 3.24 |

TABLE 7

| SURFACE NUMBER | (1 + k) | A4 | A6 | A8 | A10 | A12 |
|---|---|---|---|---|---|---|
| 3 | 1.000 | 1.200E−03 | −3.808E−05 | 9.368E−07 | 2.054E−09 | 0.000E+00 |
| 4 | 1.000 | 3.778E−04 | −1.006E−05 | 1.942E−07 | −2.011E−10 | 0.000E+00 |
| 5 | −2.102 | −3.012E−04 | −1.179E−06 | −6.309E−08 | 2.433E−09 | 0.000E+00 |
| 6 | −55.914 | −5.483E−04 | 2.543E−06 | −5.850E−08 | 1.702E−09 | 0.000E+00 |
| 7 | 1.000 | −6.465E−04 | −1.454E−06 | −1.343E−07 | 4.344E−09 | 0.000E+00 |
| 8 | 1.000 | −3.065E−04 | 4.775E−06 | −1.149E−07 | 3.133E−09 | 0.000E+00 |
| 12 | 1.051 | −7.103E−04 | 3.972E−06 | −2.269E−07 | 1.072E−09 | 0.000E+00 |
| 13 | 83.541 | −1.416E−03 | −1.869E−06 | 6.470E−07 | −9.351E−09 | 0.000E+00 |

TABLE 8

| TEMPERATURE COEFFICIENT OF RELATIVE REFRACTIVE INDEX OF GLASS MATERIAL TO d LINE | |
|---|---|
| FOURTH LENS | $-5.9 \times 10^{-6}$/K |
| FIFTH LENS | $-2.0 \times 10^{-6}$/K |
| SIXTH LENS | $2.2 \times 10^{-6}$/K |
| SEVENTH LENS | $-5.9 \times 10^{-6}$/K |

Third Embodiment (1) Configuration of Imaging Lens

Figure 5:
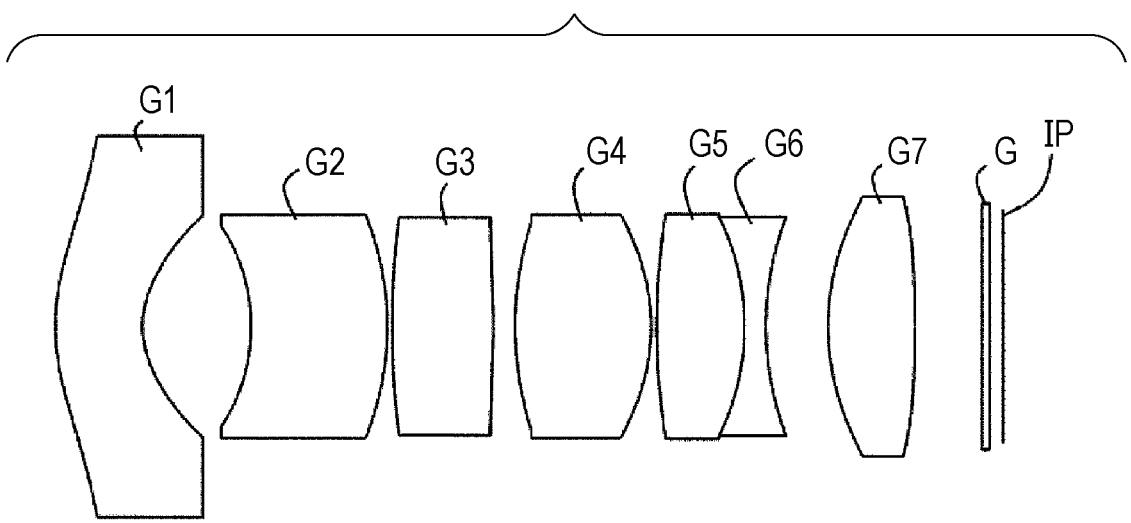
FIG. 5 is a cross-sectional view of an exemplary lens configuration of an imaging lens according to a third embodiment of the present invention.

FIG. 5 is a lens cross-sectional views of a configuration of an imaging lens according to a third embodiment of the present invention. The imaging lens includes a meniscus-shaped first lens G1 which has a convex surface facing to the object side, a meniscus-shaped second lens G2 which has a concave surface facing to the object side and has negative refractive power, a third lens G3 which has positive refractive power and has a biconvex shape, a fourth lens G4 which has positive refractive power and has a biconvex shape, a cemented lens formed by bonding a fifth lens G5 which has positive refractive power and has a biconvex shape and a sixth lens G6 which has negative refractive power and has a biconcave shape, and a seventh lens G7 which has positive refractive power and has a biconvex shape in order from the object side. As indicated in Table 9 below, both surfaces of the first lens G1, both surfaces of the third lens G3, both surfaces of the fourth lens G4, and both surfaces of the seventh lens G7 are aspherical surfaces. The imaging lens is a fixed-focus lens of which a focal length is fixed.

(2) Numerical Example

A numerical example to which specific values of the imaging lens adopted in the third embodiment are applied will be described. Tables 9 to 12 respectively indicate lens data of the imaging lens, various data of the imaging lens, aspherical surface data, and a temperature coefficient of a relative refractive index relative to a d line of each glass material forming the fourth lens to the seventh lens (unit: $1 \times 10^{-6}$/K).

Numerical values of the conditional expressions (1) to (5) of the imaging lens will be described below. These values are indicated together with values in other examples an Table 17.

Conditional expression (1): 0.27 (f1=−11.37, f2=−41.49)

Conditional expression (2): 0.98 (f12=−10.20, f4567=10.41)

Conditional expression (3): −2.68 (fourth lens), −2.64 (fifth lens), −2.68 (seventh lens)

Conditional expression (4): 0.80 (f0=5.68, YS1=1.78)

Conditional expression (5): 0.19 (Yim=4.27, θim=60.00, f0=5.68)

Figure 6:
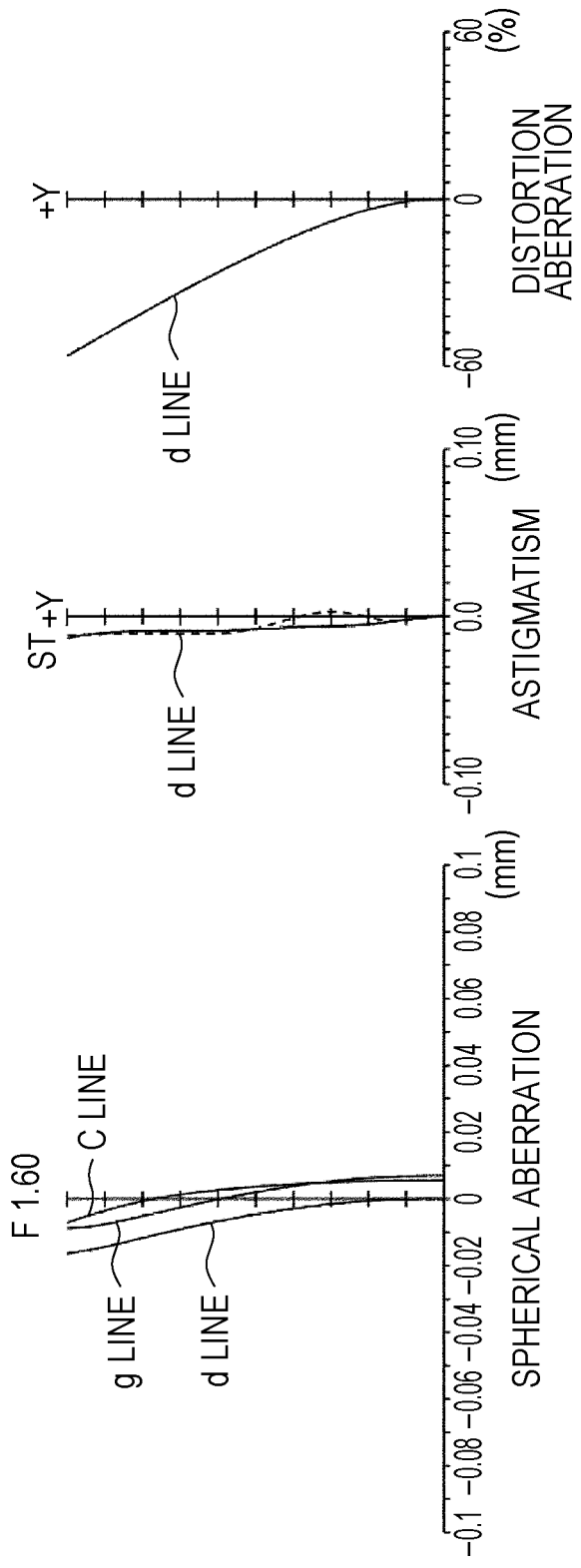
FIG. 6 is a spherical aberration diagram, an astigmatism diagram, and a distortion aberration diagram at the time of infinity focusing of the imaging lens according to the third embodiment.

FIG. 6 is a vertical aberration diagram at the time of infinity focusing of the imaging lens. As illustrated in FIG. 6, the imaging lens has a large negative distortion aberration.

TABLE 9

| SURFACE NUMBER | r | d | nd | vd |
|---|---|---|---|---|
| 1※ | 8.01 | 3.20 | 1.773 | 49.5 |
| 2※ | 3.47 | 4.00 | | |
| 3 | −6.63 | 5.00 | 1.835 | 42.7 |
| 4 | −11.01 | 0.20 | | |
| 5※ | 35.14 | 3.70 | 1.773 | 49.5 |
| 6※ | −43.04 | 0.81 | | |
| 7※ | 12.03 | 5.00 | 1.497 | 81.6 |
| 8※ | −7.35 | 0.20 | | |
| 9 | 25.94 | 3.23 | 1.593 | 68.6 |
| 10 | −9.10 | 0.80 | 1.728 | 28.3 |
| 11※ | 11.20 | 2.28 | | |
| 12※ | 9.00 | 3.20 | 1.497 | 81.6 |
| 13※ | −92.25 | 2.45 | | |
| G | INF | 0.30 | 1.517 | 64.2 |
| G | INF | 0.50 | | |
| IP | INF | | | |

TABLE 10

| VARIOUS DATA | |
|---|---|
| FOCAL LENGTH (mm) | 5.68 |
| F NUMBER | 1.60 |
| HALF ANGLE OF VIEW (°) | 60.00 |
| IMAGE HEIGHT (mm) | 4.27 |
| LENS TOTAL LENGTH (mm) | 34.88 |
| BACK FOCUS AT THE TIME OF 20° C. (mm) | 3.25 |
| BACK FOCUS AT THE TIME OF 105° C. (mm) | 3.25 |
| BACK FOCUS AT THE TIME OF −30° C. (mm) | 3.26 |

TABLE 11

| SURFACE NUMBER | (1 + k) | A4 | A6 | A8 | A10 | A12 |
|---|---|---|---|---|---|---|
| 1 | 0.327 | −7.298E−04 | −1.501E−05 | 5.869E−07 | −7.303E−09 | 3.473E−11 |
| 2 | 0.484 | −2.223E−03 | −7.162E−05 | 3.420E−06 | −9.982E−08 | 5.784E−19 |
| 5 | −10.1113 | 9.943E−05 | −4.171E−06 | 2.271E−07 | −1.143E−08 | 7.836E−18 |
| 6 | 1.000 | 2.129E−04 | 6.869E−06 | 7.142E−08 | −3.629E−09 | −2.253E−17 |
| 7 | 1.000 | −2.470E−04 | 8.725E−06 | −1.951E−07 | 6.890E−09 | 0.000E+00 |
| 8 | 0.728 | 2.995E−04 | −1.303E−05 | 9.210E−08 | 2.636E−09 | −1.667E−18 |
| 12 | 1.000 | −8.852E−05 | 3.533E−06 | −5.044E−07 | 7.906E−09 | 0.000E+00 |
| 13 | 1.000 | −1.031E−03 | 4.117E−05 | −1.459E−06 | 2.243E−08 | 0.000E+00 |

TABLE 12

| | TEMPERATURE COEFFICIENT OF RELATIVE REFRACTIVE INDEX OF GLASS MATERIAL TO d LINE |
|---|---|
| FOURTH LENS | −5.9 × 10^−6/K |
| FIFTH LENS | −2.0 × 10^−6/K |
| SIXTH LENS | 2.2 × 10^−6/K |
| SEVENTH LENS | −5.9 × 10^−6/K |

Fourth Embodiment (1) Configuration of Imaging Lens

Figure 7:
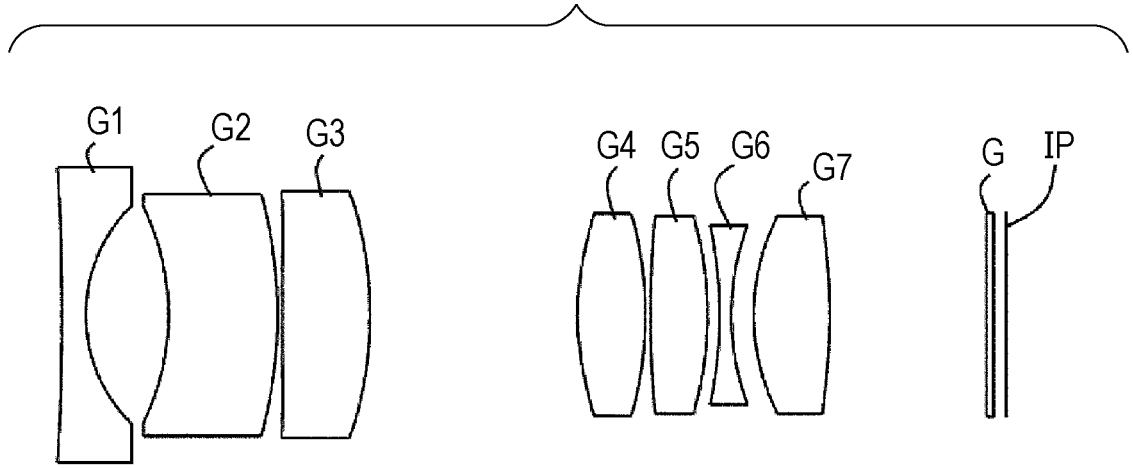
FIG. 7 is a cross-sectional view of an exemplary lens configuration of an imaging lens according to a fourth embodiment of the present invention.

FIG. 7 is a lens cross-sectional view of a configuration of an imaging lens according to a fourth embodiment of the present invention. The imaging lens includes a first lens G1 which has a biconcave shape, a meniscus-shaped second lens G2 which has a concave surface facing to the object side and has negative refractive power, a third lens G3 which has positive refractive power and has a convex shape on the object side, a fourth lens G4 which has positive refractive power and has a biconvex shape, a fifth lens G5 which has positive refractive power and has a biconvex shape, a sixth lens G6 which has negative refractive power and has a biconcave shape, and a seventh lens G7 which has positive refractive power and has a biconvex shape in order from the object side. As indicated in Table 13 to be described later, both surfaces of the third lens G3, both surfaces of the fourth lens G4, and both surfaces of the seventh lens G7 are aspherical surfaces.

The imaging lens is a fixed-focus lens of which a focal length is fixed.

(2) Numerical Example

A numerical example to which specific values of the imaging lens adopted in the fourth embodiment are applied will be described. Tables 13 to 16 respectively indicate lens data of the imaging lens, various data of the imaging lens, aspherical surface data, and a temperature coefficient of a relative refractive index relative to a d line of each glass material forming the fourth lens to the seventh lens (unit: 1×10^−6/K).

Numerical values of the conditional expressions (1) to (5) of the imaging lens will be described below. These values are indicated together with values in other examples in Table 17.

Conditional expression (1): 0.23 (f1=−7.78, f2=−34.40)

Conditional expression (2): 0.54 (f12=−6.36, f4567=11.72)

Conditional expression (3): −2.68 (fourth lens), −2.64 (fifth lens), −2.68 (seventh lens)

Conditional expression (4): 0.83 (f0=4.93, YS1=1.48)

Conditional expression (5): 0.28 (Yim=4.20, θim=58.20, f0=4.93)

Figure 8:
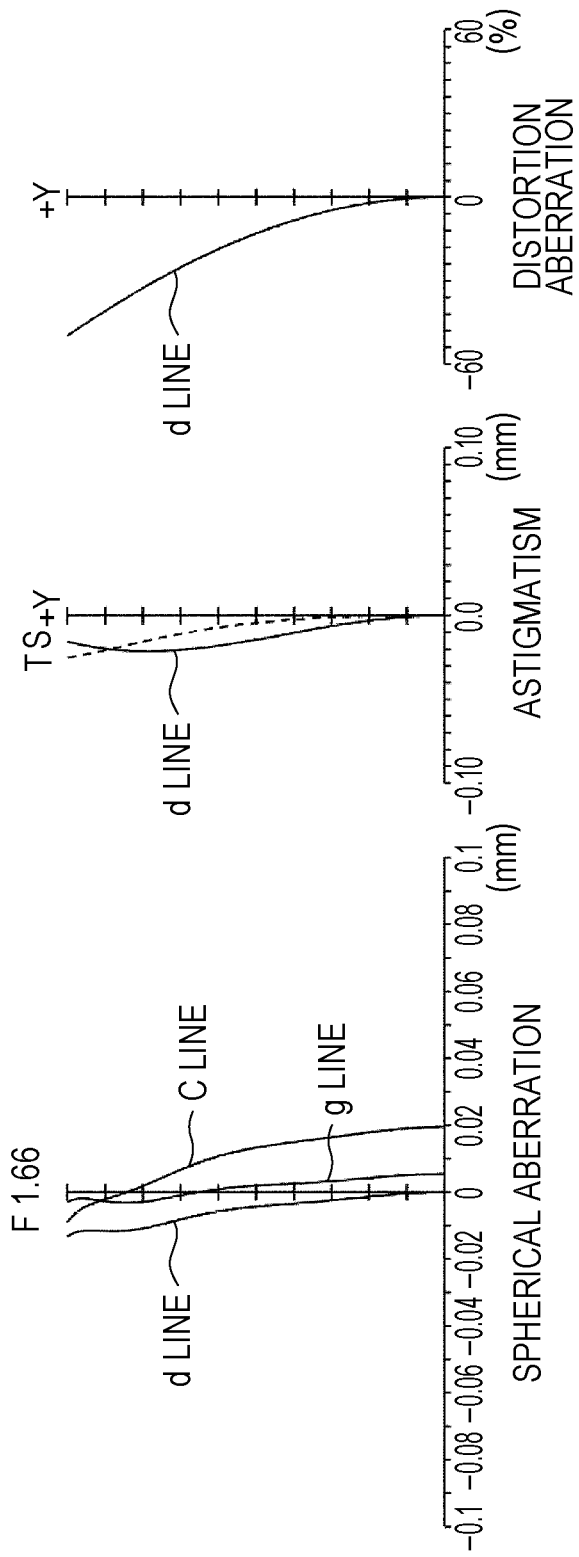
FIG. 8 is a spherical aberration diagram, an astigmatism diagram, and a distortion aberration diagram at the time of infinity focusing of the imaging lens according to the fourth embodiment.

FIG. 8 is a vertical aberration diagram at the time of infinity focusing of the imaging lens. As illustrated in FIG. 8, the imaging lens has a large negative distortion aberration.

TABLE 13

| SURFACE NUMBER | r | d | nd | vd |
|---|---|---|---|---|
| 1 | −100.09 | 1.00 | 1.773 | 49.6 |
| 2 | 6.42 | 3.47 | | |
| 3 | −10.26 | 4.61 | 1.806 | 33.3 |
| 4 | −19.55 | 0.20 | | |
| 5※ | 126.08 | 3.70 | 1.851 | 40.1 |
| 6※ | −17.28 | 8.75 | | |
| 7※ | 12.01 | 2.86 | 1.497 | 81.6 |
| 8※ | −14.93 | 0.20 | | |
| 9 | 43.81 | 2.42 | 1.593 | 68.6 |
| 10 | −14.47 | 0.50 | | |
| 11 | −17.522 | 0.50 | 1.728 | 28.3 |
| 12 | 10.62 | 0.93 | | |
| 13※ | 9.00 | 3.21 | 1.497 | 81.6 |
| 14※ | −24.00 | 6.61 | | |
| G | INF | 0.30 | 1.517 | 64.2 |
| G | INF | 0.50 | | |
| IP | INF | | | |

TABLE 14

| VARIOUS DATA | |
|---|---|
| FOCAL LENGTH (mm) | 4.93 |
| F NUMBER | 1.66 |
| HALF ANGLE OF VIEW (°) | 58.20 |
| IMAGE HEIGHT (mm) | 4.20 |
| LENS TOTAL LENGTH (mm) | 39.76 |
| BACK FOCUS AT THE TIME OF 20° C. (mm) | 7.41 |
| BACK FOCUS AT THE TIME OF 105° C. (mm) | 7.41 |
| BACK FOCUS AT THE TIME OF −30° C. (mm) | 7.42 |

TABLE 15

| SURFACE NUMBER | (1 + k) | A4 | A6 | A8 | A10 | A12 |
|---|---|---|---|---|---|---|
| 5※ | 1.000 | −1.352E−04 | −1.012E−06 | −4.903E−08 | 9.647E−10 | −2.878E−11 |
| 6※ | 1.000 | −5.794E−05 | −1.009E−06 | −6.619E−09 | −3.498E−10 | −4.207E−13 |
| 7※ | 1.000 | −1.938E−04 | −5.667E−06 | 1.832E−07 | −1.500E−08 | −1.996E−19 |

TABLE 15-continued

| SURFACE NUMBER | (1 + k) | A4 | A6 | A8 | A10 | A12 |
|---|---|---|---|---|---|---|
| 8※ | 1.000 | 1.104E−04 | −3.549E−06 | 4.035E−08 | −1.002E−08 | 1.304E−19 |
| 13※ | 1.000 | −1.095E−04 | 3.571E−06 | −4.190E−08 | 8.875E−09 | 6.460E−21 |
| 14※ | 1.000 | 6.977E−05 | 7.315E−06 | −2.350E−07 | 1.762E−08 | −8.575E−21 |

TABLE 16

TEMPERATURE COEFFICIENT OF RELATIVE REFRACTIVE INDEX OF GLASS MATERIAL TO d LINE

| FOURTH LENS | −5.9 × 10^−6/K |
|---|---|
| FIFTH LENS | −5.8 × 10^−6/K |
| SIXTH LENS | 2.2 × 10^−6/K |
| SEVENTH LENS | −5.9 × 10^−6/K |

TABLE 17

| CONDITIONAL EXPRESSION | | FIRST EMBODIMENT | SECOND EMBODIMENT | THIRD EMBODIMENT | FOURTH EMBODIMENT |
|---|---|---|---|---|---|
| (1) f1/f2 | | 0.31 | 0.13 | 0.27 | 0.23 |
| (2) −f12/f4567 | | 0.43 | 0.66 | 0.98 | 0.54 |
| (3) dndt_p/dndt6 | FOURTH LENS | −2.68 | −2.68 | −2.68 | −2.68 |
| | FIFTH LENS | −2.64 | −0.91 | −2.64 | −2.64 |
| | SEVENTH LENS | −2.68 | −2.68 | −2.68 | −2.68 |
| (4) f0/(4 × YS1) | | 0.80 | 0.80 | 0.80 | 0.83 |
| (5) $\{(Yim/\tan(\theta im))/f0\}^2$ | | 0.24 | 0.17 | 0.19 | 0.28 |

According to the present invention, it is possible to provide an imaging lens and an imaging device which can image a far object at high resolution and has a wide angle of view while reducing an entire size of the device. Therefore, the imaging lens is suitable for an imaging device mounted on various moving bodies (land moving body, aerial moving body, marine moving body), an imaging device which is installed and fixed to various buildings such as a monitoring imaging device, a security imaging device, and particularly, suitable for a sensing camera which is mounted on various moving bodies and used to detect or recognize objects forward in a traveling direction and around each moving body.

What is claimed is:

1. An imaging lens comprising:
    a first lens having negative refractive power;
    a meniscus-shaped second lens having a concave surface facing to an object side and having negative refractive power;
    a third lens having a convex shape on the object side and having positive refractive power;
    a fourth lens having a convex surface on the object side and having positive refractive power;
    a fifth lens having positive refractive power;
    a sixth lens having negative refractive power; and
    a seventh lens having positive refractive power, wherein
    the first lens to the seventh lens are arranged in above order from the object side, and
    the imaging lens satisfies a following conditional expression:

$f0/(4 \times YS1) \leq 1.0$ where
    f0: focal length of the imaging lens
    YS1: maximum ray height of upper line of axial ray on an object side surface of the first lens.

2. The imaging lens according to claim 1, wherein the imaging lens satisfies a following conditional expression:

$0 < f1/f2 < 1.0$ where
    f1: focal length of the first lens
    f2: focal length of the second lens.

3. The imaging lens according to claim 1, wherein the imaging lens satisfies a following conditional expression:

$0 < -f12/f4567 < 1.0$ where
    f12: composite focal length of the first lens and the second lens
    f4567: composite focal length of the fourth lens, the fifth lens, the sixth lens, and the seventh lens.

4. The imaging lens according to claim 1, wherein at least one of the fourth lens, the fifth lens, and the seventh lens is formed of a glass material which satisfies a following condition:

$-15 < dndt\_p/dndt6 < 0$ where
    dndt_p: temperature coefficient of a relative refractive index of the glass material relative to a d line
    dndt6: temperature coefficient of a relative refractive index of a glass material of the sixth lens relative to the d line.

5. The imaging lens according to claim 1, wherein the fifth lens and the sixth lens are bonded to each other.

6. The imaging lens according to claim 1, wherein at least one of the fourth lens to the seventh lens is supported by a lens supporting portion so that a position of the lens can be changed along an optical axis direction.

7. The imaging lens according to claim 1, wherein the imaging lens satisfies a following conditional expression:

$0.1 < \{(Yim/\tan(\theta im))/f0\}^2 < 0.4$ where
    Yim: image height of an effective image circle
    θim: incident half angle of view of the effective image circle
    f0: focal length of the imaging lens.

8. An imaging device comprising:
the imaging lens according to claim 1; and
an image sensor configured to receive an optical image formed by the imaging lens and convert the image into an electrical image signal.

9. An imaging lens comprising:
a first lens having negative refractive power;
a meniscus-shaped second lens having a concave surface facing to an object side and having negative refractive power;
a third lens having positive refractive power;
a fourth lens having a convex surface on the object side and having positive refractive power;
a fifth lens having positive refractive power;
a sixth lens having negative refractive power; and
a seventh lens having positive refractive power, wherein
the first lens to the seventh lens are arranged in above order from the object side, and
at least one of the fourth lens to the seventh lens is supported so that a position of the lens can be changed along a direction perpendicular to an optical axis.

10. An imaging lens comprising:
a first lens having negative refractive power;
a meniscus-shaped second lens having a concave surface facing to an object side and having negative refractive power;
a third lens having positive refractive power;
a fourth lens having a convex surface on the object side and having positive refractive power;
a fifth lens having positive refractive power;
a sixth lens having negative refractive power; and
a seventh lens having positive refractive power, wherein
the first lens to the seventh lens are arranged in above order from the object side, and
the imaging lens satisfies a following conditional expression:

$$0.1 < \{(Yim/\tan(\theta im))/f0\}^2 < 0.4$$

where
Yim: image height of an effective image circle
θim: incident half angle of view of the effective image circle
f0: focal length of the imaging lens.

\* \* \* \* \*